US010712226B2

(12) United States Patent
Larach

(10) Patent No.: US 10,712,226 B2
(45) Date of Patent: Jul. 14, 2020

(54) AUTONOMOUS IDENTIFICATION OF AN ANOMALOUS AQUEOUS STREAM FROM AN AQUEOUS SOURCE FEEDING MULTIPLE INDEPENDENT STREAMS AND REMEDIATION DIRECTIVE DETERMINATION THEREOF

(71) Applicant: HYDROSMART TECHNOLOGIES, INC., Del Mar, CA (US)

(72) Inventor: Mario Larach, Del Mar, CA (US)

( * ) Notice: Subject to any disclaimer, the term of this patent is extended or adjusted under 35 U.S.C. 154(b) by 80 days.

(21) Appl. No.: 15/560,985

(22) PCT Filed: Apr. 1, 2016

(86) PCT No.: PCT/US2016/025754
§ 371 (c)(1),
(2) Date: Sep. 22, 2017

(87) PCT Pub. No.: WO2016/161389
PCT Pub. Date: Oct. 6, 2016

(65) Prior Publication Data

US 2018/0045599 A1 Feb. 15, 2018

Related U.S. Application Data

(60) Provisional application No. 62/142,612, filed on Apr. 3, 2015.

(51) Int. Cl.
*G01M 3/28* (2006.01)
*G08B 21/18* (2006.01)
(Continued)

(52) U.S. Cl.
CPC ........... *G01M 3/2815* (2013.01); *E03B 7/003* (2013.01); *F16K 17/28* (2013.01); *G01M 3/28* (2013.01); *G08B 21/18* (2013.01); *G08B 25/08* (2013.01)

(58) Field of Classification Search
CPC ....... G01M 3/2815; G01M 3/28; F16K 17/28; G08B 25/08; G08B 21/18; E03B 7/003;
(Continued)

(56) References Cited

U.S. PATENT DOCUMENTS 4,355,654 A * 10/1982 Levesque ............ G01M 3/2815 137/110
5,004,014 A * 4/1991 Bender .................. E03B 7/071 137/624.12
(Continued)

OTHER PUBLICATIONS

International Search Report and Written Opinion for PTC/US2016/025754, dated Jul. 5, 2016, 12 pages.

*Primary Examiner* — William M McCalister

(57) ABSTRACT

Aqueous streams are ubiquitous in everyday life. Aqueous streams are invariably an essential element in most residential, commercial, and industrial environments. In residential and commercial environments, aqueous streams are utilized in indoor and outdoor applications. Indoor applications may include, but are not limited to, lavatories, showers, tubs, toilets, laundry, ice-making, drink dispensing, dish washing, pot fillers, laboratory, cooling and refrigeration, and heating. Outdoor applications may include, but are not limited to, landscaping, water features, spas, pools, washing, or even water attractions in the case of entertainment parks. Provided herein are systems, methods, and devices for identification of an anomalous aqueous stream from an aqueous source feeding multiple independent streams and remedial action directive determination thereof.

31 Claims, 5 Drawing Sheets

118
106
108
110
116
112
122
104
114
102
100
120
≤150'
UTILITY WATER SYSTEM
PRIVATE WATER SYSTEM

(51) Int. Cl.

| | |
|---|---|
| ***E03B 7/00*** | (2006.01) |
| ***F16K 17/28*** | (2006.01) |
| ***G08B 25/08*** | (2006.01) |

(58) Field of Classification Search

CPC .......... E03B 7/071; E03B 7/072; E03B 7/075; E03B 7/08

See application file for complete search history.

(56) References Cited

U.S. PATENT DOCUMENTS

| | | | | |
|---|---|---|---|---|
| 6,239,708 | B1 * | 5/2001 | Young | E03B 7/071 137/1 |
| 6,424,960 | B1 | 7/2002 | Lee et al. | |
| 6,799,170 | B2 | 9/2004 | Lee et al. | |
| 2003/0183018 | A1 | 10/2003 | Addink et al. | |
| 2005/0056081 | A1 * | 3/2005 | Gocho | G01M 3/2815 73/40 |
| 2005/0145018 | A1 | 7/2005 | Sabata et al. | |
| 2008/0308157 | A1 * | 12/2008 | Zhuang | F16K 37/0066 137/12 |
| 2009/0194719 | A1 * | 8/2009 | Mulligan | E03B 7/071 251/129.01 |
| 2010/0313958 | A1 * | 12/2010 | Patel | E03B 7/071 137/1 |
| 2011/0025511 | A1 | 2/2011 | Wien | |
| 2011/0215945 | A1 * | 9/2011 | Peleg | G01M 3/2807 340/870.02 |
| 2012/0060936 | A1 * | 3/2012 | Hobmeyr | F17C 13/00 137/14 |
| 2014/0026644 | A1 | 1/2014 | Patel et al. | |
| 2014/0255216 | A1 * | 9/2014 | Kallesoe | E03B 7/075 417/53 |

* cited by examiner

AUTONOMOUS IDENTIFICATION OF AN ANOMALOUS AQUEOUS STREAM FROM AN AQUEOUS SOURCE FEEDING MULTIPLE INDEPENDENT STREAMS AND REMEDIATION DIRECTIVE DETERMINATION THEREOF

CROSS-REFERENCE TO RELATED APPLICATIONS

This application is the National Stage filing under 35 U.S.C. 371 of International Application No. PCT/US2016/025754, filed on Apr. 1, 2016, which claims priority to U.S. Provisional Application No. 62/142,612, filed on Apr. 3, 2015, the contents of which are all hereby incorporated by reference herein in their entirety.

TECHNICAL FIELD

This disclosure generally relates to systems, methods, and devices for autonomous identification of an anomalous aqueous stream from an aqueous source feeding multiple independent streams and remedial action directive determination thereof.

BACKGROUND ART

Aqueous streams are ubiquitous in everyday life. Aqueous streams are invariably an essential element in most residential, commercial, and industrial environments.

In residential and commercial environments, aqueous streams are utilized in indoor and outdoor applications. Indoor applications may include, but are not limited to, lavatories, showers, tubs, toilets, laundry, ice-making, drink dispensing, dish washing, pot fillers, laboratory, cooling and refrigeration, and heating. Outdoor applications may include, but are not limited to, landscaping, water features, spas, pools, washing, or even water attractions in the case of entertainment parks.

Although many of the indoor and outdoor applications of residential and commercial environments can be found in industrial environments, aqueous streams in industrial environments are primarily utilized in the industrial processes required to manufacture a product that may or may not be an aqueous product. For example, in a bottling plant, the final product is a beverage which is an aqueous product. On the other hand, in a fabric plant, although it may use aqueous dying and washing processes, the ultimate product is a solid fabric.

For residential, commercial, and many industrial environments, the source aqueous stream is primarily water. This water source is typically supplied by the local water utility. The local water utility installs a water meter at the water service entrance to a building site.

A fixture for the use of water at a building site is referred to herein as a water fixture. Each water fixture in a water supply system represents a certain maximum demand of water. For example, a clothes washer may have a maximum demand of 6 gallons per minute (gpm) while a bidet may only have a maximum demand of 2 gpm. The maximum demand of each water fixture does not necessarily represent the typical demand from the fixture. For example, a kitchen faucet may have a maximum demand of 3 gpm but may typically be only partially opened to demand only 1 gpm.

The water meter installed by the local water utility is normally sized based on the maximum flow rate from simultaneous demand of all the water fixtures at the site.

This total theoretical demand for a water supply system is calculated by adding the maximum demand of all water fixtures at the site. Thus, for example, the local water utility may install a 1" meter at a site with a theoretical maximum flow rate demand of 50 gpm and a 4" meter at a site with a theoretical maximum flow rate demand of 500 gpm.

Since typically not all water fixtures are operating at the same time, the typical maximum flow demand can be substantially less than the theoretical maximum flow demand. The quantity and type of water fixtures, in addition to water fixture user behaviors, can greatly impact the variability between the theoretical maximum flow demand and typical maximum flow demand.

The range of water service pressure, in pounds per square inch (psi), at the water meter may vary greatly within a water utility service area. For example for the Southeast San Diego Community Planning Area, encompassing site elevations ranging from 20 feet to 175 feet above mean sea level, the maximum static water system pressure within the planning area ranges from a low of 90 psi to a high of 160 psi.

Pressures lower than 55 psi may result in water fixtures operating poorly. High water pressure into a building site may damage internal plumbing pipes as well as cause water fixtures to malfunction; for this reason, the Plumbing Code requirement requires pressure regulators be installed on all water services greater than 80 psi. High system water pressure is also of a concern to the utility water operations as pipeline leaks or pipeline breaks will be more severe if the system is operating at higher pressures.

Since pressure regulators are part of a building site's private water system, the site owner will typically contract a licensed plumber to install the required pressure regulating valve and make the proper adjustments for the site's water pressure requirements which for residential and commercial applications is typically set between 60 and 70 psi. Over time, pressure regulators can fail due to corrosion or deposit buildup and thus requires that the pressure regulator be checked periodically by a licensed plumber.

Understanding hydraulics, or the study of fluid behavior at rest (hydrostatic) and in motion (hydrodynamic), is essential for installing an effective water distribution system at a building site that minimizes the potential for damage to pipes and water fixtures. Since the water meter typically is located at the water service entrance to a building site it is the first device calculated into a water-distribution system design that inevitably results in having the proper flow and pressure at the farthest water fixture in the building. For a water fixture to operate properly and avoid damage it may not only have the fixture's water flow demand available, but the static pressure at the fixture less the total hydrodynamic pressure loss at the fixture may be greater than the fixture's minimum operating pressure requirement but less than the fixture's maximum operating pressure rating.

Static (hydrostatic) pressure measures water at rest or water that is experiencing no friction or pressure loss due to movement. The formula for water pressure in pounds per square inch (psi) is force (in lbs) divided by area (in inches squared). When the area is constant, the force of water depends on its elevation. One foot of water elevation is equal to 0.433 psi or alternatively stated one psi equals 2.31 feet of water elevation. Fixtures installed at a building site may have significant or minor differences in elevation. For example, a bathroom lavatory faucet installed on the first floor will have a significantly different elevation than a bathroom lavatory faucet installed on the second floor; for illustrative purposes say a 14 foot difference. Likewise a bathroom lavatory faucet installed on the second floor will have a minor difference in elevation compared to a tub faucet installed slightly lower but still on the same second floor; for illustrative purposes say a 6 inch (one half foot) difference. Thus with water at rest, fixtures at a building site will likely have varying static pressures and be different than the static water pressure at the water meter because of the differences in elevation. For the first example above if the first floor bathroom lavatory faucet had a static pressure of 60 psi, the bathroom lavatory faucet on the second floor would have a static pressure of 53.938 psi. For the second example above if the bathroom lavatory faucet on the second floor had a static pressure of 53.938 psi, the static pressure on the second floor tub faucet would be 54.1545 psi.

Dynamic (hydrodynamic or working) pressure measures water in motion or water that is experiencing pressure loss due to friction as it flows through the length of pipes, fittings, valves and other components all of which offer resistance. This dynamic pressure varies throughout the system. The amount of water flowing through the system and the physical size of the path affect friction loss. Friction loss increases as the flow or speed of water (water velocity) through the system increases. If only one water fixture were allowed to operate at any one time and assuming no variability in the flow demand at the water fixture, then the total pressure losses at a water fixture would be a fixed (non-varying) quantity and readily quantifiable. However, since water fixtures at a building site can operate singly or concurrently and further since water fixtures can have varying flow demands (as in slightly open to fully open lavatory faucets) the pressure at different points in the water distribution system at a building site will depend on the number of operating water fixtures at a given moment and the operating demand flow of each fixture at that moment making the pressure loss throughout the system and at each water fixture highly variable.

In addition water pressure at the meter normally fluctuates +/−10 psi, further increasing the variability in hydrostatic pressure delivered to the site. Additionally when repairs or maintenance is being done on the water infrastructure and water is shut off in certain areas to make repairs, the water pressure at the meter will increase above the normal fluctuating range and further impact the variability in hydrostatic pressure delivered to the site.

High water pressure into a building site may damage internal plumbing pipes of the water distribution system as well as cause water fixtures to malfunction causing water to leak at the building site.

In addition to high water pressure, water fixture user error (e.g., user left a faucet open), faulty water fixtures (e.g., defective ice maker), installation error (e.g., inadequate plumbing work), accidental damage to internal pipes or fixtures (e.g., drilling a screw into a water pipe), or aging system components (e.g., corroded pipe) are among other common causes of water leakages at building sites.

A water leak at a building site can range from slow drips to fast gushes. For illustrative examples a dripping leak may spill 15 gallons per day (about 0.01 gallons per minute) while a ½" pipe break may spill up to 60,900 gallons per day (about 423 gallons per minute).

A water leak may be immediately visible at the water site as in the case of a pipe break or may not be detected until significant time has elapsed as in the case of a small drip behind a wall partition.

Water leaks on the inside of a building site can cause extensive damage to the building structure and to furnishings at the premises requiring significant reconstruction and replacement expense. In addition, interior water leaks may lead to the growth of toxic mold and fungi requiring costly site remediation. Outdoor water leaks can cause damage to the building site's foundation, the building structure itself, as well as damage the landscape plant life. In addition to the damage caused by water leaks, water leaks represent a significant waste of water resources; water agencies estimate that for residential sites, up to 3% of all water consumed is attributable to water leaks.

Because of the expense and liability associated with water leaks, insurance companies have been increasingly placing limits on coverage for damage from water leaks and from toxic mold and fungi. In addition, when water damage has occurred, the property owner has a legal requirement, in the event of an intended property sale, to disclose the occurrence which may negatively affect the perceived value of the property to potential buyers.

Since water leaks are a common occurrence and the consequences represent significant cost, potential liability, and lost value there is significant interest in devising ways to detect and stop water leaks so as to minimize any water damage they may cause.

For industrial environments, because of the sensitivity to flows and pressures within their industrial processes, the monitoring and control of aqueous flows is achieved by installing precision pressure and flow sensors abundantly throughout the process and closely monitoring the sensors using industrial monitoring systems that automatically take corrective action in the event a leak is detected. These sensors are often part of a larger monitoring and control system that encompasses additional measurements (e.g., temperature, chemicals, and viscosity) specific to the industrial process. While it is technically possible, the cost of such an extensive and precise monitoring and control leak detection system is prohibitive for any wide scale adoption at residential and commercial environments. In addition, in residential and most commercial environments the internal pipes and connections to water fixtures are typically not readily accessible for installation of pressure or flow sensors and of control valves across branches of the water distribution system as is the case in industrial environments. Other than while under building construction, in residential and commercial environments the internal pipes of the water distribution system and connections to water fixtures are often located behind walls, underneath or within floors, buried beneath the ground, in attics or crawl spaces, or at other readily inaccessible areas (e.g., behind a large built-in water fixture).

One method that is used for leak detection in residential and commercial environments is water detection beneath the water fixture. In this method, a water detection device, such as an electrical device consisting of two electrodes, is placed beneath water fixtures. The water detection device is most often passive and detects the presence of water when water completes an interrupt circuit between the two electrodes; essentially the water acts like a toggle switch to close a normally open single pole single throw switch. This water detection device is connected, either by wire or wirelessly, to a normally open shut-off valve that controls the flow of the water to the water fixture. When the interrupt circuit is completed (switch is closed) by the presence of water at the water detection device, the normally open shut-off valve is activated to close and thereby stopping any further water flow to the water fixture. This method has many shortfalls. Among the shortcomings is the requirement that a water detection device together with a paired shut-off valve be installed at each and every water fixture. This method assumes that if a water fixture were to leak, the water would flow to where the user has placed the water detection device. If water from a leak were to flow elsewhere, the presence of water would not be detected. In addition, to install the shut-off valve requires basic plumbing knowledge, fittings, and tools, as otherwise an improperly installed shut-off valve will create more opportunity for leaks than if the water detecting device were not installed. Another shortcoming of this method is that there must be electrical power available to enable activation of the shut-off valve. In the case of an AC power requirement, it is uncertain whether an AC outlet will be located near where the shut-off valve for the fixture would need to be installed (e.g., beneath a tub). In the case of battery power, this introduces the requirement of replacing batteries periodically to make sure there is sufficient power to shut the valve if and when a leak is detected. These power requirements would also apply in the case of powering wireless connectivity between the water detection device and the shut-off valve. Another shortcoming of this method is the inability to access the plumbing pipe line to a water fixture. For example, installing this method to a built-in dishwasher would require removing the dishwasher and installing the shut-off valve in such a way that it would not obstruct the dishwasher's placement. This method is also inappropriate for many types of water fixtures; for example, for a shower the placement of the water detection device is not reasonable and placement of the shut-off valve would require major effort and expense to get access to the water fixture's water line typically located behind a water-tight wall. Even in the case where all water fixtures were readily accessible without causing any obstruction by the installation of the device, and where there was a nearby power source at each water fixture to meet any power requirements, and where the water detecting device placement would properly detect any water leaking from the fixture, a typical residential or commercial environment would require numerous devices being installed which would represent a significant expense in the cost of purchasing the devices as well as the cost of properly installing the devices. Perhaps one of the largest shortcomings of this method is that while it may shut-off water to an individual leaky water fixture, many water leaks do not originate at the fixtures themselves but originate from the connections to the water fixtures and from the internal pipes of the water distribution system. These connections and internal pipes, as mentioned above, are not readily accessible and further, if they were, would require water detecting devices beneath and along the entire lengths of the internal piping which is not practical nor economically feasible. This method also has limited application in outdoor environments although a variant can be found in soil moisture detection for irrigation interrupt applications.

Another method that is used for leak detection in residential and commercial environments is flow detection at the water fixture. In this method, a flow detection device is placed in line with the plumbing pipe line feeding the water fixture. This device incorporates a flow sensor and a normally open shut-off valve as part of the assembly and can be powered either by battery or AC power. This device is designed to detect continuous water flow (e.g., slow drips, open faucet) and/or excessively large flows (e.g., loose fixture fitting) at the fixture. The thresholds for "continuous flow" (e.g., maximum time of flow) or "excessive flow" (e.g., maximum flow rate) are either preset, set by the user, or conceivably could even be a learned behavior setting albeit at a significant increase in unit cost of the device. When either the continuous flow or excessive flow threshold is exceeded at the water fixture, the normally open shut-off valve is activated to close and thereby stopping any further water flow to the water fixture. This method suffers from all of the same shortfalls as the "water detection beneath the water fixture" method previously described (with the exception of sensitivity to placement of the water detection device which is not applicable to this method) making this method equally impractical and equally economically unviable for effectively detecting and stopping water leaks at residential and commercial environments. In addition, if and when there is a leak with a rate flow below the maximum flow rate then water will continue to leak until the maximum time of flow is exceeded, for example 10 minutes. Thus by the time the 10 minutes have elapsed the water damage will have already taken place; for example just a ⅛" opening in a pipe may spill up to 26 gallons during a 10 minute period (about 2.64 gpm). As an illustrative example, a 140-gallon capacity bathroom spa with a faucet rated at 14 gpm max would take more than 10 minutes to fill at ¾ max flow rate (about 10.5 gpm), yet a ⅛" leak in the fixture line after the flow detection device would either not be detected (total flow from the device is 13.14 gpm which is less than the 14 gpm max flow) or would be detected after significant water damage has already occurred (after 10 minutes for example); further, and perhaps more importantly, if the ⅛" leak were right before the flow detection device, the leak would not be detected at all by this method.

Yet another method that is used for leak detection in residential and commercial environments is flow threshold monitoring after the water meter at the water service entrance to a building site. In this method, a flow detection device is placed after the water meter at the water service entrance to a building site but before branching into the internal pipes of the water distribution system. This device incorporates a flow sensor and a normally open shut-off valve as part of the assembly and can be powered either by battery or AC power. This device is designed to detect continuous water flow and/or excessively large flows into the building site. The thresholds for "continuous flow" (e.g., maximum time of flow) or "excessive flow" (e.g., maximum flow rate) are either preset, set by the user, or conceivably could even be a learned behavior setting. When either the continuous flow or excessive flow threshold is exceeded after the meter, the normally open shut-off valve is activated to close and thereby stopping any further water flow to the site. This method has many shortfalls as it more accurately represents detection of continuous or large water consumption at the site rather than leak detection. Since this method measures the totality of the flow into the site's water distribution system it considers a total flow longer than the maximum time of flow setting or a total flow greater than the maximum flow rate setting as a "leak" and will terminate flow. Since water fixtures can operate singly or concurrently, the maximum time of flow setting and the maximum flow rate setting are prone to causing this method to frequently interrupt the flow of water to the site since (a) fixtures operating sequentially but with overlap may have a demand flow for longer than the maximum time of flow, (b) fixtures operating concurrently may have a flow demand greater than the maximum flow rate setting, and (c) a single fixture can operate for longer than the maximum time of flow (e.g., a long shower). In addition, as in the case of the "flow detection at the fixture" method, if and when there is a leak with a rate flow below the maximum flow rate then water will continue to leak until the maximum time of flow is exceeded by which time the water damage will have already taken place.

SUMMARY

In summary, traditional leak detection methods are too costly, too impractical, or too unreliable for effectively detecting water leaks, stopping water leaks, and preventing water damage at residential and commercial sites to be acceptable for successful wide scale market adoption. To be effective, a system should reliably and quickly detect a true leak not just at the water fixtures but anywhere within the water distribution system, including the internal piping, and then swiftly stop any further flow of water from the leak point. To be cost-effective, the system should be low cost in its totality with a minimum number of devices which (a) can readily be installed at existing sites without incurring substantial costs for multiple plumbing connections, and (b) do not require access to inaccessible pipes or fixture components (e.g., shower valves) of the internal water distribution system. To be robust the system should minimize introducing installation or user error by (a) minimizing or eliminating any user interface requirement (e.g., programming settings), (b) minimizing or eliminating the need to maintain numerous batteries sufficiently charged across various devices, and (c) minimizing the total number of new plumbing connections and fittings required.

Provided herein are systems, methods, and devices for autonomous identification of an anomalous aqueous stream from an aqueous source feeding multiple independent streams and remedial action directive determination thereof. In one embodiment, the method comprises the steps of autonomously identifying the underlying independent component aqueous streams from the aqueous source feeding these multiple streams, detecting any anomalous streams from among the identified independent component streams, and determining remedial action directives based on analysis of any anomalous streams detected.

In another embodiment, the method comprises adding the step of applying contextual information to the above mentioned embodiment so as to improve the speed and accuracy in detecting anomalous streams from among the identified independent component streams and to also increase the responsiveness and assertiveness of any corresponding remedial action directives for the anomalous streams detected.

In an exemplary embodiment, the aqueous source is the water source at residential and commercial sites. In such an embodiment, the method autonomously identifies the independent water streams flowing within the water distribution system of a site from the water source flowing into the site, detects any anomalous water streams from among the independent water streams identified, such as water leaks, and determines remedial action directives based on the analysis of any anomalous water streams detected, such as stopping any further water flow or providing cautionary notifications to the water distribution system site manager and/or site management system.

Provided in some embodiments is a method of autonomously identifying and responding to anomalous aqueous streams comprising the steps of autonomously identifying the underlying independent component aqueous streams from the aqueous source feeding these multiple streams, detecting any anomalous streams from among the identified independent component streams and determining remedial action directives based on analysis of any anomalous streams detected.

In some embodiments, the aqueous source is water. In some embodiments, the aqueous source is oil. In some embodiments, the aqueous source is fuel.

In some embodiments, the anomalous stream is a water leak. In some embodiments, the anomalous stream is an oil leak. In some embodiments, the anomalous stream is a fuel leak.

In some embodiments, the anomalous stream is water flowing errantly from a defective water fixture. In some embodiments, the anomalous stream is water flowing errantly from improper use of a water fixture.

In some embodiments, the method further includes the step of applying contextual information so as to improve the speed and accuracy in detecting anomalous streams from among the identified independent component streams and to also increase the responsiveness and assertiveness of any corresponding remedial action directives for the anomalous streams detected.

In some embodiments, the identifying and responding to anomalous water streams is implemented using a system comprising a plurality of sensor devices installed at the water service entrance, an automatic shut-off valve installed at the water service entrance, a sensor device installed at the furthest water fixture readily accessible, a data receiving device, a data storage device, a computing device, and a communication device.

In some embodiments, the plurality of sensors, the automatic shut-off valve, and a pressure regulating valve are integrated into a single device.

In some embodiments, the data receiving device, the data storage device, the computing device, and the communication device are integrated into a single device.

In some embodiments, the integrated device containing the plurality of sensors, the automatic shut-off valve, and a pressure regulating valve is powered by the integrated device containing the data receiving device, the data storage device, the computing device, and the communication device.

In some embodiments, raw data or analyzed method information is shared with a hub. In some embodiments, the raw data or analyzed method information is shared with a cloud analytic service. In some embodiments, contextual information is received from a hub.

In some embodiments, the method further includes the step of sending and receiving notifications to the system manager(s) and using responses received for classifying any uncertain anomalous streams.

In some embodiments, the devices communicate through a combination of either wired or wireless communication directly or indirectly through a local network.

In some embodiments, information is received from a cloud analytic service which can be utilized by the method and can be communicated to the system manager(s).

Provided in some embodiments is a system for detecting an anomaly in an aqueous stream network that comprises an inlet feeding a plurality of independently-controlled valves at outlets of the stream network. In one embodiment, the system for detecting an anomaly in an aqueous stream network comprises a flow sensor and an inlet pressure sensor positioned at the inlet of the stream network, a downstream pressure sensor positioned in a branch of the network downstream of the inlet (where the branch feeds one of the independently-controlled valves at outlets of the stream network), and a data receiving and processing device. The data receiving and processing device stores one or more programs, the one or more programs include instructions, which when executed by one or more processors cause the device to receive a flow reading from the flow sensor, receive a first pressure reading from the inlet pressure sensor, receive a second pressure reading from the downstream pressure sensor, estimate a pressure difference based on the first pressure reading and the second pressure reading, and detect the anomaly based on the flow reading and the pressure difference.

As an exemplary advantage, the systems described herein can detect an anomalous stream anywhere within the aqueous stream network without having to place a detection device at each and every branch or node of the network.

In some embodiments, the downstream pressure sensor includes a single pressure sensor, and the system contains no more pressure sensors than the inlet pressure sensor and the downstream pressure sensor. As an exemplary advantage, the use of few sensors significantly decreases the labor and installation costs of the system.

In some embodiments, the downstream pressure sensor is positioned on an accessible pipe of the stream network. In some embodiments, the accessible pipe is the furthest accessible pipe of the stream network from the inlet. As an exemplary advantage, placement of the downstream pressure sensor at the furthest accessible pipe of the stream network allows for more sensitive detection of anomalous streams.

In some embodiments, the inlet pressure sensor comprises two sensors positioned on opposite sides of a pressure regulating valve. As an exemplary advantage, the two sensors may compensate for fluctuations in the upstream pressure as a result of the fluctuations from downstream pressure changes. The two sensors may also compensate for an inefficient or defective pressure regulating valve. In some embodiments, the inlet pressure sensor consists of a single pressure sensor. Thus, implementation of this exemplary embodiment may only require placement of three devices at the readily accessible locations where access to any required power (or battery power) can be readily be made available, and can all be done with minimal plumbing expense and minimal total acquisition costs. In addition, since the system requires fewer devices and components placed throughout the stream network, this reduces the amount of error in the system, which includes installation error, user error, and error due to damage or aging of system components.

In some embodiments, the system further includes an automatic shut-off valve positioned at the inlet.

In some embodiments, the instructions from the data receiving and processing device further include directions to send a signal to the automatic shut-off valve to close in response to detecting the anomaly. As an exemplary advantage, the automatic shut-off valve may provide a fully autonomous anomaly detection and remediation device, when coupled other embodiments described herein.

In some embodiments, the flow sensor, the inlet pressure sensor, and the automatic shut-off valve are integrated in a single device. As an example advantage, some embodiments allow for ease of replacement when retrofitting an existing system by simply installing the single integrated device at an inlet to the network. In some embodiments, the single device further includes a pressure regulator.

In some embodiments, the instructions from the data receiving and processing device further include receiving contextual information from an external analytic service. In some embodiments, detecting the anomaly is based on the flow reading, the pressure difference, and the contextual information.

Also provided herein are methods of detecting and responding to an anomaly in an aqueous stream network, wherein the stream network comprises an inlet feeding a plurality of independently-controlled valves at outlets of the stream network. In some embodiments, the method includes the steps of measuring a flow rate at the inlet, measuring a pressure loss between the inlet and one of the independently controlled valves at outlets of the stream network, detecting the anomaly by analyzing the flow rate and the pressure loss, and initiating remedial action in response to detecting the anomaly. In an exemplary advantage, the methods provided herein trigger remedial action before any significant damage has occurred.

In some embodiments, measuring the pressure loss includes measuring a pressure at a furthest accessible pipe from the inlet in the aqueous stream. As an exemplary advantage, measurement of the pressure at the furthest accessible pipe from the inlet allows for more sensitive detection of anomalous streams.

In some embodiments, measuring the flow rate includes periodically sampling a plurality of flow rates. In some embodiments, measuring the pressure loss comprises periodically sampling a plurality of pressure losses. In some embodiments, analyzing the flow rate and the pressure loss comprises analyzing the plurality of flow rates and plurality of pressure losses.

In some embodiments, measuring the pressure loss includes measuring a pressure at the inlet and measuring a pressure at one of the independently controlled valves at outlets of the stream network.

In some embodiments, measuring the pressure at the inlet includes measuring a pressure on opposite sides of a pressure regulator. As an exemplary advantage, the two sensors may compensate for fluctuations in the upstream pressure as a result of the fluctuations from downstream pressure changes. The two sensors may also compensate for an inefficient or defective pressure regulating valve.

In some embodiments, the one of the independently controlled valves at outlets of the stream network is the furthest accessible pipe of the stream network from the inlet.

In some embodiments, detecting the anomaly consists of analyzing the flow rate and the pressure loss.

In some embodiments, the pressure loss is a dynamic pressure loss.

In some embodiments, detecting the anomaly further includes analyzing contextual information.

In some embodiments, the remedial action includes closing an automatic shut-off valve at the inlet. As an exemplary advantage, the automatic shut-off valve may provide a fully autonomous anomaly detection and remediation device, when coupled with other embodiments described herein.

In some embodiments, initiating the remedial action includes providing cautionary notifications via a communication device. In an exemplary advantage, this allows the method to be completely autonomous without any user intervention.

Implementation of the exemplary embodiments described herein may overcome some or all of the shortfalls of traditional leak detection methods, and may provide a robust and cost-effective way to stop water leaks at a site, minimize water damage, and conserve water resources.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
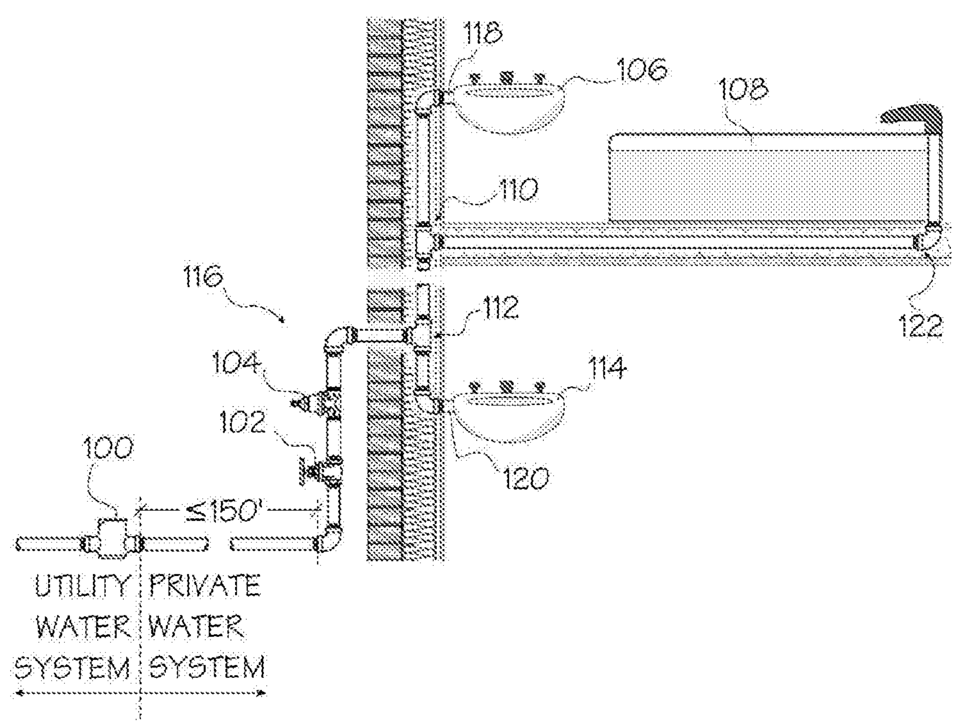
FIG. 1 illustrates a simplified water distribution system from a plumbing context.

As a first step in describing an Autonomous Aqueous Stream Component Analysis method, it is helpful to transform a water distribution system from a plumbing "pipes and fixtures" system context to an informational signal system context. FIG. 1 illustrates a simplified water distribution system from a plumbing context comprising a water meter supplied by the water utility 100, a manual shut-off valve 102, a pressure regulating valve (PRV) 104, internal plumbing pipes and fittings 110, 112, 122, external plumbing pipes and fittings 118, 120, a lower lavatory water fixture (level with the PRV) 114, an upper lavatory water fixture above the lower lavatory fixture 106, and a bathroom tub fixture slightly below the upper lavatory fixture 108. In FIG. 1, observe that the property site side of the water meter 100 marks the dividing line between the utility water system and the private water system; the utility shall not modify any part of the private water system and likewise the site owner shall not modify any part of the utility water system. Also observe that the water meter 100 may be located at a significant distance from the water service entrance 116 to the building itself; the water meter 100 can be located up to 150 feet from the water service entrance 116. In FIG. 1 water flows from the water meter 100 to the water service entrance 116 and into the internal plumbing pipes and fittings 110, 112, 122. Observe further that most of the plumbing pipes and fittings are internal to the structure and are not readily accessible. Observe also that the water service entrance 116 to the building is readily accessible.

Figure 2:
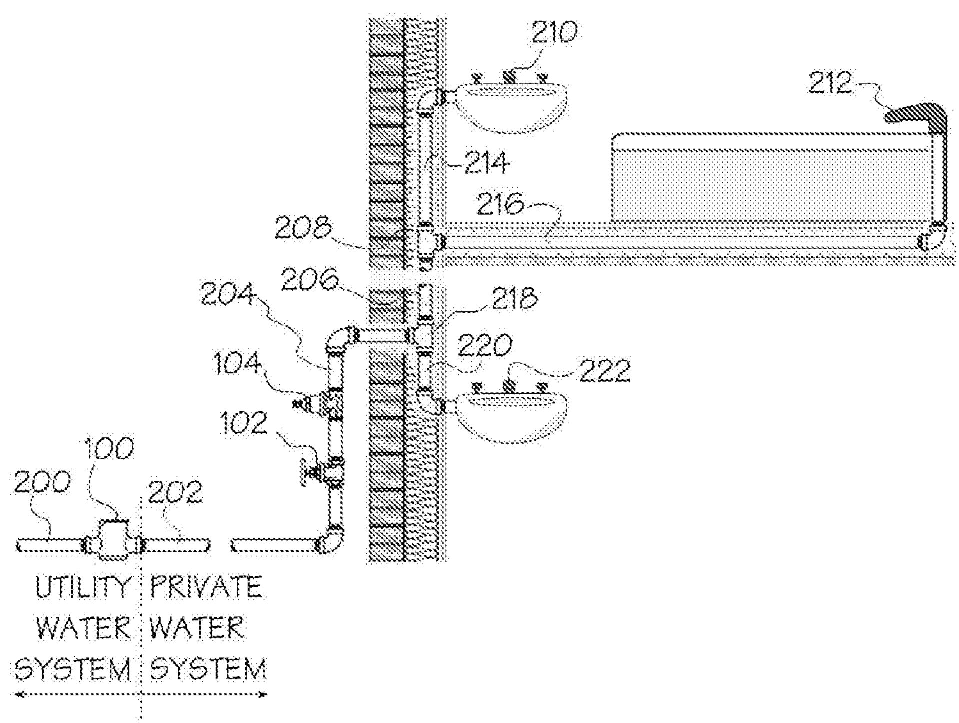
FIG. 2 illustrates a simplified water distribution system from an informational signal system context.

FIG. 2 is the resulting transformation of the plumbing system of FIG. 1 into an informational signal system context. The informational signal system not only comprises the water meter 100, the manual shut-off valve 102, and the pressure regulating valve 104 as in FIG. 1, but also comprises a signal mixture 204 located immediately after the pressure regulating valve 104, source signals 210, 212, 222, signal branches 214, 216, 206, 220, and signal nodes 208, 218. FIG. 2 also illustrates the water service into the meter 200 and the water service out of the meter 202. In FIG. 2 at a signal node 208, 218 the informational signal system divides into two or more signal branches 214, 216, 206, 220, with each signal branch ultimately terminating at a source signal 210, 212, 222. Note that while in FIG. 1 water flows from the water meter 100 to the water service entrance 116 and into the internal plumbing pipes and fittings 110, 112, 122, in FIG. 2 the source signals 210, 212, 222 feed into the signal nodes 208, 218 via the signal branches 214, 216, 206, 220 (i.e., the direction of travel is contextually reversed).

Turning now to the source signals 210, 212, 222 and the signal mixture 204 within the informational signal system. The source signals can be analyzed for the characteristics of (a) water flow rate, (b) water flow time, (c) water flow frequency, and (d) dynamic water pressure loss. For the water flow rate characteristic of the source signals, observe that the source signals are statistically independent; two or more signals are statistically independent of each other when the value of one signal provides no information regarding the value of the other signals. Thus for example if the lower source signal 222 is flowing at 2 gpm it has no impact on the upper source signals 210, 212 flow rates. Likewise if the upper left source signal 210 is flowing at 1 gpm it has no impact on the upper right source signal 212 or on the power source signal 222 flow rate. Another observation is that the signal at each signal node is a signal mixture consisting of the arithmetic sum of the source signals from each signal branch feeding into the signal node. Thus for example if the lower source signal 222 is 2 gpm, the upper left source signal 210 is 1 gpm, and the upper right source signal 212 is 14 gpm, the signal mixture would be 15 gpm at the upper node 208 and 17 gpm at the lower node 218. Since the source signals are statistically independent the water flow rate source signals will each have, depending on the fixture type and usage, either a super-Gaussian (e.g., Laplace) distribution or a sub-Gaussian (e.g., Bernoulli) distribution, while the water flow rate signal mixtures will have a Gaussian (e.g., Normal) distribution.

For the water flow time characteristic of the source signals, the signal is either flowing (ON) or not flowing (OFF). The signal as water flow time can thus be represented in Boolean logic (TRUE/FALSE) for each sampled moment in time; for example if the upper left source signal 210 was sampled every minute over 5 minutes and was flowing for the last two minutes, the signal source would be FALSE, FALSE, FALSE, TRUE, TRUE for the ordered samples for a total continuous flow time of two minutes. An information signal system for the water flow ON/OFF time has similar characteristics (independent signal sources, non-Gaussian distribution for source signals, and Gaussian distribution for the signal mixture) as that of water flow rate signals with the exception that the signal mixtures at the signal nodes are not the arithmetic sum of the signal sources from each signal branch feeding into the signal node, but rather the water flow ON/OFF time at the signal mixture is the result of the Boolean logic compound OR function of the source signals feeding into the signal node. For example if for the same five minutes that the upper left source signal 210 was sampled, the upper right source signal 212 was flowing for the third minute only and the lower source signal 222 was flowing for the second, third, and fourth minutes, the signal mixture at the upper signal node 208 would be FALSE, FALSE, TRUE, TRUE, TRUE for the ordered samples for a total continuous flow time of three minutes and the signal mixture at the lower signal node 218 would be FALSE, TRUE, TRUE, TRUE, TRUE for the ordered samples for a total continuous flow time of four minutes.

For the water flow frequency characteristic of the source signals, the signal is indicative as to how often the source signal is continuously active (flowing) over a sampled period. For example, if the upper left source signal 210 was sampled over a 24-hour period and was continuously active in 5 instances during this period, the upper left source signal would have a water flow frequency of 5 instances per 24-hour period. An information signal system for the water flow frequency has similar characteristics (independent signal sources, non-Gaussian distribution for source signals, and Gaussian distribution for the signal mixture) as that of water flow rate signals with the exception that the signal mixtures at the signal nodes are not the arithmetic sum of the source signals from each signal branch feeding into the signal node. For water flow rate signals, the signal mixtures at the signal nodes is the number of instances the result of the Boolean logic compound OR function of the water flow time signal sources feeding into the signal node is continuously active (TRUE) over the sampled period. For example, if the upper left source signal 210 had a water flow frequency of 5 instances of continuously active water flow per a 24-hour period and the upper right source signal 212 had 3 instances of continuously active water flow during the same 24-hour period with one of these 3 instances partially overlapping with one of the 5 instances of the upper left source signal 222 and the remaining two instances having no overlap, then the signal mixture at signal node 208 would be 7 instances per 24-hour period.

For each of the water flow rate, the water flow time, and the water flow frequency characteristics of the informational signal system transformation of FIG. 2, the highest order (i.e., final) signal mixture in each case is at the lower signal node 208, which is readily inaccessible as it forms part of the internal plumbing pipes and fittings 110, 112, 122 of FIG. 1. However the same signal mixture at this lower signal node 208 is found at the signal mixture 204 located immediately after the pressure regulating valve 104 as illustrated in FIG. 2. Unlike the signal mixture at the lower signal node 208, this same highest order signal mixture 204 located immediately after the pressure regulating valve 104 is readily accessible.

For the dynamic water pressure loss characteristic of the source signals the source signals are not statistically independent. As discussed previously the amount of water flowing through the system and the physical size of the path affect friction loss. Friction loss increases as the flow or speed of water (water velocity) through the system increases and thus the dynamic pressure varies throughout the system. For example, if only the lower source signal 222, located level with the pressure regulating valve 104 and having a static pressure of 60 psi, was flowing water, then with a flow rate of 10 gpm there would be dynamic pressure losses throughout the signal system. In this example pressure losses could be, for example, 2.14 psi between the water meter 100 and the lower node 218 and 1.08 psi between the lower signal node 218 and the lower source signal 222. Under these conditions, the total dynamic pressure loss at the lower source signal 222 would be 3.22 psi. However, even though they are not flowing water, the upper source signals 210, 212 will also have a dynamic pressure loss. For example, the upper left source signal 210 (assuming 14' higher than the lower source signal 222) and the upper right source signal 212 (assuming 6' lower than the upper left source signal 210) would each have a dynamic pressure loss of 2.14 psi resulting in pressures of 51.7980 and 52.0145 respectively. Thus, for the dynamic water pressure loss characteristics the value of one signal provides new information regarding the value of the other signals and as such the dynamic water pressure loss signals are not statistically independent. As a consequence, the distribution of the source signals for dynamic water pressure loss will have a Gaussian (e.g., Normal) distribution. For the signal mixtures of dynamic water pressure loss, recall from above that in the informational signal system the direction of travel is contextually reversed from the traditional water distribution system. For illustrative purposes only, in an example where there is no dynamic pressure loss between the signal mixture 204 located immediately after the pressure regulating valve 104 and the lower signal node 218 then in a traditional water distribution system the dynamic pressure loss at the signal mixture 204 would always be zero since the pressure regulating valve 104 maintains the pressure constant. However, in the informational signal system for the earlier example in this paragraph, the dynamic pressure loss into the signal mixture 204 would be 3.22 psi. Thus, the signal mixture at a signal node is the arithmetic sum of the dynamic pressure losses from the branches feeding into it. The signal branches of an informational signal system form part of the internal plumbing pipes and fittings 110, 112, 122 of FIG. 1 and are thus readily inaccessible. Therefore, obtaining these dynamic pressure losses from the branches to calculate the signal mixture at each signal node is not realistic for residential and commercial sites. While the signal mixture 204 is readily accessible under a traditional water distribution system the dynamic pressure loss is always zero at the signal mixture 204 and the dynamic pressure losses in the water system are essentially hidden. In FIG. 2 the water service into the meter 200 and the water service out of the meter 202 are illustrated. When water is flowing, there is a dynamic pressure loss across the water meter 100. Since dynamic pressure loss in water is proportional to the square of the velocity of the water, dynamic water pressure losses have a non-linear response to water flow rates. However, the log base 10 of the dynamic pressure losses has a linear response to the log base 10 water flow rates. Therefore, the log base 10 of the dynamic pressure loss across the water meter 100 will correlate with the log base 10 of the dynamic pressure loss for each of the signal branches 214, 216, 206, 220. Hence, obtaining the dynamic pressure loss across the water meter 100 provides insight into the dynamic pressure loss of the of the signal branches 214, 216, 206, 220. However, to obtain the dynamic pressure loss across the water meter 100 would require placement of a pressure sensor at the water service into the meter 200 and another sensor at the water service out of the meter 202 which is not realistic since as described earlier the utility shall not modify any part of the private water system and likewise the site owner shall not modify any part of the utility water system. In addition, the water meter 100 may be installed at a significant distance from the water service entrance to the building making the installation of any cables for sensor data exchange or power difficult and potentially costly. Another benefit of calculating the dynamic pressure loss across the water meter 100 is that the net difference in pressure between water service into the meter 200 and water service out of the meter 202 nullifies any impact from the normal, albeit significant, variations in pressure of the water service into the water meter as well as nullifies any impact from variations in pressure of the water service into the water meter resulting from utility repairs and maintenance. Because of these variations in pressure on the water service into the water meter an absolute pressure measurement before the pressure regulating valve at the water service entrance to a building is less meaningful. However, placement of an additional water meter as part of the water service entrance 116 system with pressure sensors at the appropriate steady flow points on both sides of the water meter, provides all the benefits described above and overcomes the issues of accessing the utility water system, power availability, and any required cabling for power or sensor data communication. The log base 10 of the dynamic pressure loss across this new meter would be correlated to a function of the log base 10 of the dynamic pressure losses for each of the system's signal branches 214, 216, 206, 220. This water meter also provides the ability to measure the water flow rate, the water flow time, and the water flow frequency of the signal mixture 204. As will be discussed later, to augment the correlation of the pressure loss across the new meter with the system's signal branches the water pressure loss between the pressure regulating valve 104 and the most readily accessible external fitting furthest from the signal mixture 118 will also be measured.

In an actual residential or commercial building site the water distribution system would be significantly more complex, including accounting for both cold and hot water, with many more signal branches, signal nodes, and signal sources than those illustrated in FIG. 2. However, even in highly complex water distribution systems the statistical characteristics of the information signal systems described above hold.

Because only a signal mixture is present at the water service entrance and because most of the signal branches and signal nodes are part of an inaccessible internal water distribution the current leak detection methods previously described are either too costly, or too impractical, or too unreliable for effectively detecting, stopping water leaks, and preventing water damage at residential and commercial sites to be acceptable for successful wide scale market adoption.

Whereas the signal branches and signal nodes remain hidden to the previously described methods the herein disclosed systems and methods are able to separate the source signal components from the signal mixture present at the water service entrance. The systems and methods leverage, amongst many other integrated analytical methods, neural networks and blind source separation techniques. Blind source separation represents a large class of methods for separating data into underlying informational components. The term "blind" is used to imply that these methods can separate data into source signals even when the nature of those source signals is unknown. A particular method of blind source separation is independent component analysis. While many of the traditional blind source separation methods extract a set of uncorrelated signals from a set of mixtures, independent component analysis separates an observed set of signal mixtures into a set of statistically independent component signals or source signals. This implies a lack of correlation, but a lack of correlation does not imply independence. In essence signals from different physical processes are uncorrelated, but uncorrelated signals are not necessarily from different physical processes. The systems and methods described herein leverage this implication to resolve that if statistically independent signals can be extracted from signal mixtures then these extracted signals must be from different physical processes. The implications are illustrated in the quintessential case of blind source separation often referred to as the "cocktail party". In a "cocktail party" example there are two individuals speaking at the same time, source 1 and source 2. There are also two microphones at the table that pick up two different voice (signal) mixtures of the two individuals speaking at the same time. With traditional blind source separation techniques the outputs would be a new set of voice mixtures. With independent component analysis the output would be a set of single voices (i.e., estimates of the source signals themselves). In simplest terms, independent component analysis seeks to blindly determine the coefficients of an un-mixing matrix so as to recover the original source signals from a set of signal mixtures.

Independent component analysis is based on at least three fundamental principles. First is the independence principle which states if source signals are independent and signal mixtures are not then extracting independent signals from a set of signal mixtures can recover the source signals. Second is the principle of normality meaning if the source signals have non-Gaussian distributions and the signal mixtures do not then extracting signals with non-Gaussian distributions from a set of signal mixtures can recover the source signals. Lastly, the principle of complexity states that if the source signals have low complexity structure and the signal mixtures do not then extracting signals with low complexity from a set of signal mixtures can recover the source signals.

Recall that the water flow rate, the water flow time, and the water flow frequency signal sources of the informational signal system transformation of FIG. 2 were both independent and had non-Gaussian distributions. Likewise, recall that the highest order (i.e., final) signal mixture found at the water service entrance was not-independent and had a Gaussian distribution. Thus the first two principles for applying independent component analysis are satisfied. The third principle is also established because the informational signal system the source signals feed into the nodes through the branches so that by definition the signal mixtures at the nodes are at least equally complex if not more complex than the source signals.

Independent component analysis has been used for many applications including voice mixtures, EEG, fMRI, and fetal heart monitoring. For example, applications of independent component analysis in the separation of sound source signals, such as voice, is described in U.S. Pat. Nos. 6,424,960 and 6,799,170, both of which are incorporated by reference herein in their entireties. In addition to battlefield voice applications, the author has applied independent component analysis for electronic counter-countermeasures against advanced radar jammers whose waveform noise statistics are highly non-Gaussian and for improvement of passive submarine sonar systems in tracking a target in noisy shallow water environments confounded with multi-path reflections. Having satisfied the three principles it would appear that independent component analysis can be applied to separating the original source signals from the signal mixture of a water distribution system. However with independent component analysis there must typically be at least as many different mixtures of a set of source signals as there are source signals, and as shown in FIG. 2 there is only one signal mixture 204 of non-Gaussian source signals readily accessible.

An exemplary component analysis may include the number of mixtures is equal to number of sources. Exemplary equations include.

Signal Mixtures Equation Format — Equation 1

$$x_1 = a_{11}s_1 + a_{12}s_2$$

$$x_2 = a_{21}s_1 + a_{22}s_2$$

-continued

Signal Mixtures Matrix Format — Equation 2

$$\begin{pmatrix} x_1 \\ x_2 \end{pmatrix} = \begin{pmatrix} a_{11} & a_{12} \\ a_{21} & a_{22} \end{pmatrix} \begin{pmatrix} s_1 \\ s_2 \end{pmatrix}$$

Unmixed Source Signals Estimation — Equation 3

$$\begin{pmatrix} s_1 \\ s_2 \end{pmatrix} = \begin{pmatrix} w_{11} & w_{12} \\ w_{21} & w_{22} \end{pmatrix} \begin{pmatrix} x_1 \\ x_2 \end{pmatrix}$$

However, the equations above may not be optimal in some instances. When the number of mixtures is less than the number of sources, the equations above may be overcomplete and some estimation of the unmixing matrix $W_z$ may be helpful.

Overcomplete Signal Mixtures Equation Format — Equation 4

$$x_1(t) = a_{11}s_1(t) + a_{12}s_2(t) + a_{13}s_3(t)$$
$$x_2(t) = a_{21}s_1(t) + a_{22}s_2(t) + a_{23}s_3(t)$$

Overcomplete Signal Mixtures Matrix Format — Equation 5

$$\begin{pmatrix} x_1 \\ x_2 \end{pmatrix} = \begin{pmatrix} a_{11} & a_{12} & a_{13} \\ a_{21} & a_{22} & a_{23} \end{pmatrix} \begin{pmatrix} s_1 \\ s_2 \\ s_3 \end{pmatrix}$$

Unmixed Source Signals Estimation — Equation 6

$$\begin{pmatrix} s_1 \\ s_2 \\ s_3 \end{pmatrix} = \begin{pmatrix} w_{11} & w_{12} \\ w_{21} & w_{22} \\ w_{31} & w_{32} \end{pmatrix} \begin{pmatrix} x_1 \\ x_2 \end{pmatrix}$$

In some embodiments, a priori gathered information estimates of the matrices can be used so that independent component analysis can efficiently converge on the underlying source signals of the overcomplete signal mixtures. By introducing this optional information, an exemplary advantage may be that the independent component analysis not fully blind.

In some embodiments, the following a priori knowledge regarding independent aqueous sources is used:

(1) Often there will be only one aqueous source flowing through the signal mixture.

(2) It is unlikely that two or more aqueous sources begin flowing at the precisely the exact time; when two or more aqueous sources are flowing it is most likely that they began flowing at different times (3) It is unlikely that when two or more aqueous sources are flowing that they all stop flowing at the precisely the exact time; when two or more aqueous sources are flowing it is most likely that they each will stop flowing at different times (4) The probability of number of sources flowing, ranked from most likely to least likely, is 1, 2, 3, 4, 5, . . .

(5) If one aqueous source is flowing, then the systems and methods herein can optionally estimate when (a) an additional aqueous source(s) begin flowing, and (b) when an aqueous source stops flowing (6) The database can build estimates of (a) single aqueous source flow signal sources, (b) two aqueous source flow signal mixtures, (c) three aqueous source flow signal mixtures, . . . (d) build mixing matrix estimates;

(7) To perform the independent component analysis experiment, the systems and methods described herein can optionally leverage this a priori knowledge to (a) estimate the number of mixtures flowing, (b) add one or more signal mixtures to become complete (c) provide one or more initial estimates of the coefficients for the un-mixing matrix, (d) use these estimated un-mixing matrices to converge on the best mixing matrix solution to recover the underline aqueous source components, and (e) add the converged best un-mixing matrix to database.

(8) At a given site the number of total sources is fixed; and (9) The sources at a site have fixed flow rate boundaries between 0 and a max flow rate.

The systems and methods described herein can advantageously use one or both of neural learning algorithms and a priori information. In some embodiments, capturing of the characteristics of the signal mixture 204 as well as the pressure loss across a meter installed as part of the water service entrance 116 and storing this data electronically. As mentioned earlier, the systems and methods herein may also measure the water pressure loss between the pressure regulating valve 104 and the most readily accessible external fitting furthest from the signal mixture 118. This additional water pressure loss data will also be stored electronically. Since the source signals are independent and the mixed signal will often consist of a single source signal, some embodiments herein can apply certain analytics and statistical analysis, leveraging the knowledge that source signals are non-Gaussian and mixed signals have Gaussian distributions, to group the data into categories of certain frequent patterns occurring with non-Gaussian distributions and for those occurring with Gaussian distributions. Over time an accurate representation of the characteristics of frequent patterns can be secured and the distinction amongst the frequent patterns will become stronger. Thus over time a database of distinct signatures can evolve and which will continue to be refined over time with use. In some embodiments, the systems and methods are fully autonomous with no user intervention; it will be readily accepted that autonomy is possible but not required. For example, a user may easily and quickly establish an initial reference signature for all potential source signals that are associated with a water fixture. These signatures could integrate water flow rate, the water flow time, and the water flow frequency characteristics as well as the pressure loss across a water meter and the pressure loss between the service entrance and the furthest most readily accessible external fitting as previously mentioned. The signatures for the non-Gaussian signals can hence be used as a priori information for trying to obtain the coefficients of the un-mixing matrix in an independent component analysis. Further a priori information that is available is that there is often little change in the number of source signals in a water distribution system. Further there may be physical upper limits to the source signals characteristics (e.g., source signals may each have a maximum flow rate). Hence an independent component analysis can be achieved where the analysis is not a fully “blind” separation. Referring to the “cocktail party” example, the analogy would be that one would know how many people were at the table, where they were sitting relatively to each other, how fast each person normally spoke, how loud each person normally spoke, if the person normally spoke in short or long lengths, and how often they normally spoke.

Having the a priori information to assist in estimating the coefficients of the un-mixing matrix it is possible to apply unsupervised neural network learning algorithms to converge on the coefficients using the single signal mixture 204. Therefore, embodiments herein may be capable of successfully separating the signal mixture into a set of statistically independent component source signals. Implementation of the method separates the components source signals quickly and with low-cost, readily available computing resources. This step may consist of autonomously identifying the underlying independent component aqueous streams from the aqueous source feeding these multiple streams. In an exemplary embodiment where the aqueous source is the water source at residential and commercial sites this step can autonomously identify the independent water streams flowing within the water distribution system of a site from the water source flowing into the site. For illustrative examples, if in FIG. 2 the mixed signal at 204 (water flowing into a site) was 17 gpm, an Autonomous Aqueous Stream Component Analysis method would identify three independent source signals (independent water streams) flowing at 1 gpm, 2 gpm, and 14 gpm. Note that the method does not match the separated source signals to actual water fixtures (i.e., does not say that the 1 gpm source signal is the upper bathroom lavatory); in fact, as will be discussed later, the source signal may not be associated with an actual water fixture at all.

As has been disclosed the separation of the independent source signals from the mixed signal using embodiments herein may require acquiring certain information from the informational signal system. The devices used to acquire this information are readily available as standalone devices. The systems and methods described herein may provide granularity traditionally found only in industrial systems at very high price points. Flow can be measured by the 10 mL and pressure can be measured at about $1/100^{th}$ psi, both with very low error margins. These granularities and tolerances can be advantageous for meaningful differentiation and developing the mixing matrix estimates and developing distinguishable individual component profiles. An accurate arrangement of the devices may be beneficial as improper placement can distort flow and pressure readings (e.g., water turbulence, backflow, etc.). The shut-off valves also need to be reliably powered with slow close and slow opening to avoid damage to the water pipes.

In addition to having either a single integrated device or multiple signal measurement devices placed at the service entrance, an additional measurement device may be placed at the furthest external fitting that is readily accessible. As mentioned earlier, this device can augment the information from the pressure loss across the meter and increase the level of granularity of insight into the internal distribution system. For illustrative examples, if in FIG. 2 only signal source 222 was flowing at 2 gpm, the pressure drop between the pressure regulating valve 104 and the external fitting 118 of FIG. 1 would correspond to the pressure drop between 104 and 220 for a mixed signal flow of 2 gpm. If in FIG. 2 only signal source 222 and signal source 212 were flowing at 2 gpm and 14 gpm respectively, then the pressure drop between the pressure regulating valve 104 and the external fitting 118 of FIG. 1 would correspond to the pressure drop between 104 and 208 for a mixed signal flow of 2 gpm.

In addition to the measurement devices outlined above, the method can include either wired or wireless connection of the measurement devices to a data receiving device, a data storage device, and a computing device to complete the step of separating the independent source signal components. The data receiving device, the data storage device, and the computing device may be combined into a single integrated device or may be distinct devices. The data storage device and the computing device may be local, on a remote server, or a combination of both.

In some embodiments, once the method separates the independent source signals from the mixed signal, the next step can be detecting any anomalous streams from among the identified independent component streams. In an exemplary embodiment where the aqueous source is the water source at residential and commercial sites, this step detects any anomalous water streams from among the independent water streams identified, such as water leaks. Over time, the method will have collected multiple samples of the mixed signal. As previously discussed, the mixed signal could be a truly mixed signal of multiple source signals or may be a single source signal. Also as mentioned previously, said samples will be categorized into groups of certain frequent patterns across the various characteristics for both non-Gaussian distributions (e.g., source signals) and for Gaussian distributions (e.g., mixed signals). Each categorized group of samples whether composed of non-Gaussian or Gaussian distributions will have a Gaussian distribution. It is thus possible to perform hypothesis testing on each and every one of the separated component signals to determine if indeed the separated component signal could within a given degree of certainty belong to one of the categorized group of samples. The method defines an event as the presence of a separated component signal that is not assignable within a certain degree of certainty as belonging to one of the categorized group of samples. The method considers the possibility of two type of errors; a type I error (alpha error) occurs when the method determines that a source signal is assignable to one of the categorized group of samples when in actuality it is not, and a type II error occurs when the method determines that a source signal is not assignable to one of the categorized group of samples when in actuality it is. The consequences of a type I error, in the exemplary embodiment would mean that in the event of a leak, the method would determine, within a certain degree of confidence, the leak as being an actual harmless source signal which could have disastrous consequences. The consequences of a type II error, in the exemplary embodiment would mean that in the event of a harmless source signal, the method would determine, within a certain degree of confidence, the source signal to be a leak which would result in an overwhelming annoyance possibly to the point of indifference to potential notifications. Neither consequence is desirable, but the consequences of a type II error are more disastrous. Hence the method can be optimized to minimize the probability of making an incorrect decision, but with emphasis on minimizing type II errors. The analysis is performed for each of the separated source signal components of the mixed signal over the many different signal characteristics and results in one of three decisions: either the separated source signal is definitely a harmless source signal (a non-event), or the separated source signal is definitely not a harmless source signal (a Type A event), or there is insufficient information to determine whether the separated source signal is or is not a harmless source signal (a Type B event). As mentioned the decision made by the method is executed within a certain level of confidence to try and minimize the occurrence of type I errors and type II errors. This level of confidence increases (or conversely the significance level decreases) over time as the sample base size is increased and as the distribution of the categorized group of samples becomes increasingly distinct. To minimize type I errors there may be an initial excess of type II errors but which will quickly be reduced to acceptable levels as the confidence level increases. To complete this step the method leverages the device requirements outlined in the previous step; there are no additional device requirements to complete this step.

In some embodiments, the method may continue with determining remedial action directives based on analysis of any anomalous streams detected. In an exemplary embodiment where the aqueous source is the water source at residential and commercial sites this step determines remedial action directives based on the analysis of any potentially anomalous water streams detected, such as stopping any further water flow or providing cautionary notifications to the water distribution system site manager and/or site management system. As discussed earlier the embodiments herein analyze each separated source signal component from the mixed source signal and determines, within a given confidence interval, whether each separated source signal is a non-event, a Type A event, or a Type B event. For separated source signals that are determined to be non-events, these source signals can be added to the sample space. When a separated source signal is determined to be a Type A event, meaning that with a certain degree of confidence it is not a harmless source signal, the method will quarantine the separated source signal and issue a directive to stop any further water flow. This directive, for example, could be a signal to an automatic shut-off valve to shut. When a separated source signal is determined to be a Type B event, the separated source signal is flagged and a cautionary notification is sent to the water distribution system site manager and/or site management system and awaits a response. Depending on the response to the cautionary notification the method will either issue a directive to stop further water flow (response received that it is an anomalous stream), add the signal source to the sample space (response received that there is no anomalous stream), or if no response is received flag the separated source signal as an unknown, not add it to the sample space, and return to analyzing the signal mixture for further insights on the character of the unknown separated source signal.

To complete this step the method may require a wired or wireless automatic shutoff valve. The automatic shut-off valve may be a separate device or may integrated into the all-inclusive single more cost-effective, more compact device outlined earlier for fast, simple, and error-free installation at the service entrance site. In addition to the previously identified device, completion of this step may require the method incorporate a communications device. This communication device can both send notifications to and receive response from the water distribution system site manager and/or site management system. This same communication device can be used to communicate with the measurement device at the furthest external fitting that is readily accessible. This same communication device can be used to communicate with any remote storage device or remote computing device used by the method. This same communication device can be used to transmit data to cloud analytical services which can analyze the data and prepare visualizations for various potential client users. The shared data provided by the method can be highly useful to different types of clients of a cloud analytical service. For example, water agencies could use the analyzed data to better understand static pressure at sites, usage patterns over the course of a day, month, or year, product vendors such as artificial turf companies may be interested in knowing the proportion of water used for outdoors vs. indoors, service providers such as plumbing companies could use the analyzed data for pro-active site maintenance, and site-owners may be interested in monitoring their system for water conservation purposes. Likewise the communication device can be used to receive data from the clients of a cloud analytical service. For example, an artificial turf company may wish to notify the water distribution system site manager of a special purchasing opportunity based on the site's water consumption pattern.

Figure 3:
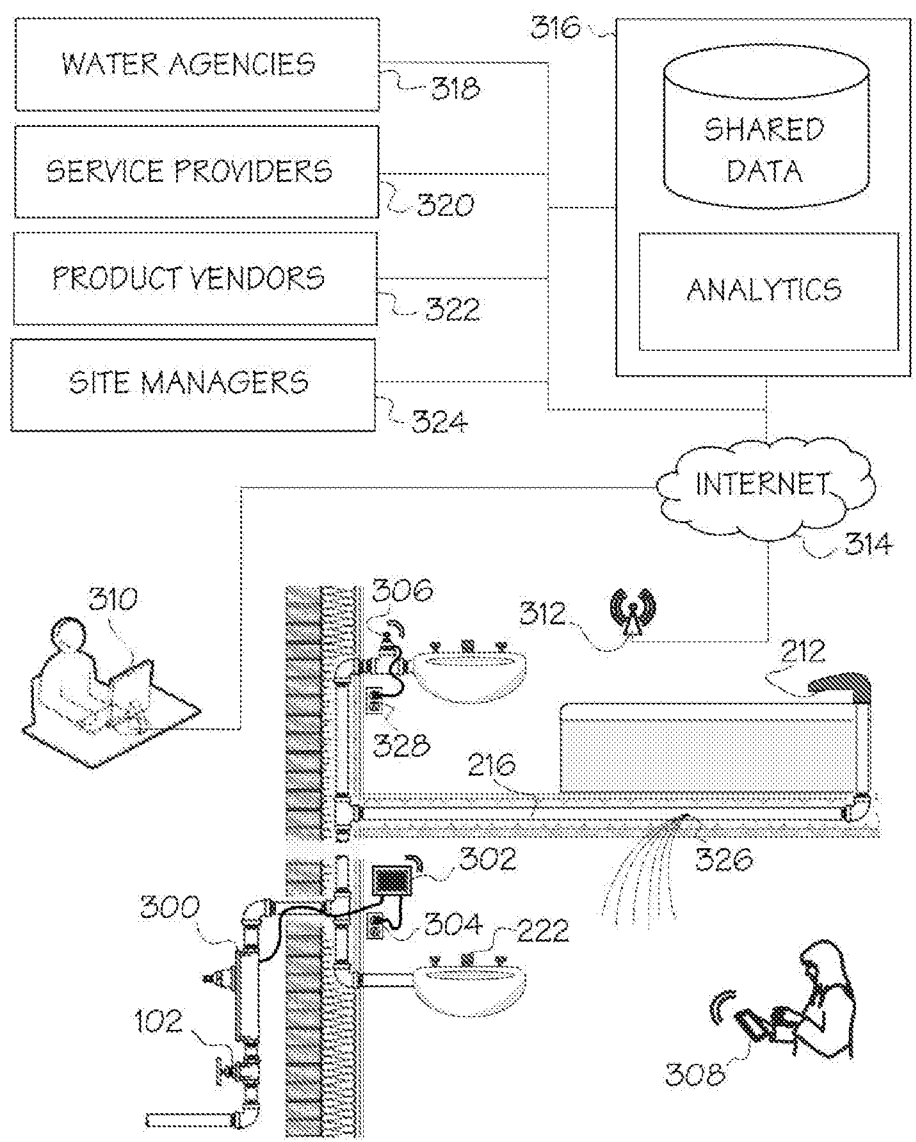
FIG. 3 is an illustrative example of an embodiment of the method, system, and devices.

FIG. 3 is an illustrative example of an embodiment. In FIG. 3 an integral entry device 300 consisting of the required sensors, a pressure regulating valve, and an automatic shut-off valve is connected by a wired harness, although it could be wireless, to an integral electronic device 302. The integral electronic device 302 contains all the necessary storage, computing, and communication components for the method and is preferably located at the interior of the site. This electronic device 302 is powered by nearby electrical outlet 304 and in turn provides any necessary power to the integral entry device 300 via the wired harness. In another embodiment of wireless communication between the integral entry device 300 and the integral electronic device 302, the integral entry device 300 would need an alternate source of power such as solar and/or battery. The electronic device 302 communicates wirelessly to the measurement device at the furthest external fitting that is readily accessible 306 and which is powered by a nearby electrical outlet 328. The electronic device 302 could alternatively communicate directly over a power-line communications protocol or indirectly over other wired network methods (e.g., CAT-5) to the measurement device at the furthest external fitting that is readily accessible 306. In the example illustrated in FIG. 3, the wireless communication is direct although it could alternatively communicate through the site's wireless network 312. The electronic device 302 also communicates to the water distribution system site manager either wirelessly to wireless devices 308 or to a wired device 310 connected to the internet 314 via the site's wireless network 312. The electronic device can connect to the internet 314 via the site's wireless network 312 to share date with a cloud analytics service 316. The cloud analytic service 316 can analyze the shared data and customize visualizations for interested client users such as water agencies 318, service providers 320, product vendors 322, and site managers 324. As an operative example, if in FIG. 3 both source signals 212 and 222 are flowing normally and simultaneously and there is also a leak 300 within an inaccessible branch 216, the method first uses the integral electronic device 302 to read and store the signal mixture sensor characteristics received from the integral entry device 300 and from the measurement device at the furthest external fitting that is readily accessible 306. The method then uses the integral electronic device 302 for computing purposes to separate the signal mixture into independent source signal components. In this case the method will separate the signal mixture into three independent source signal components A, B, and C. The method then uses the integral electronic device 302 to analyze each of the separated independent signal sources. In this case the method determines that the separated independent source signal components A and B are both non-events, but determines the separated independent source signal components C to be a Type A event, meaning that with a certain degree of confidence it is not a harmless source signal (i.e., a harmful anomalous stream). The method then uses the integral electronic device 302 to issue a remedial directive to the automatic shut-off valve integrated in the integrated entry device 300 to stop further water flow. The method also uses the integral electronic device 302 to send a notification of the action taken (i.e., water has been turned off to the site) to the wireless device(s) 308 and/or wired device(s) 310 of the water distribution system site manager(s). For illustrative purposes, a service provider 320, such as a plumber, may receive notice via the cloud analytic 316 that water to the site has been interrupted and the plumber upon receiving the notification contact the site manager(s) at their wireless device(s) 308 and/or wired device(s) 310 to schedule a service appointment.

Figure 4:
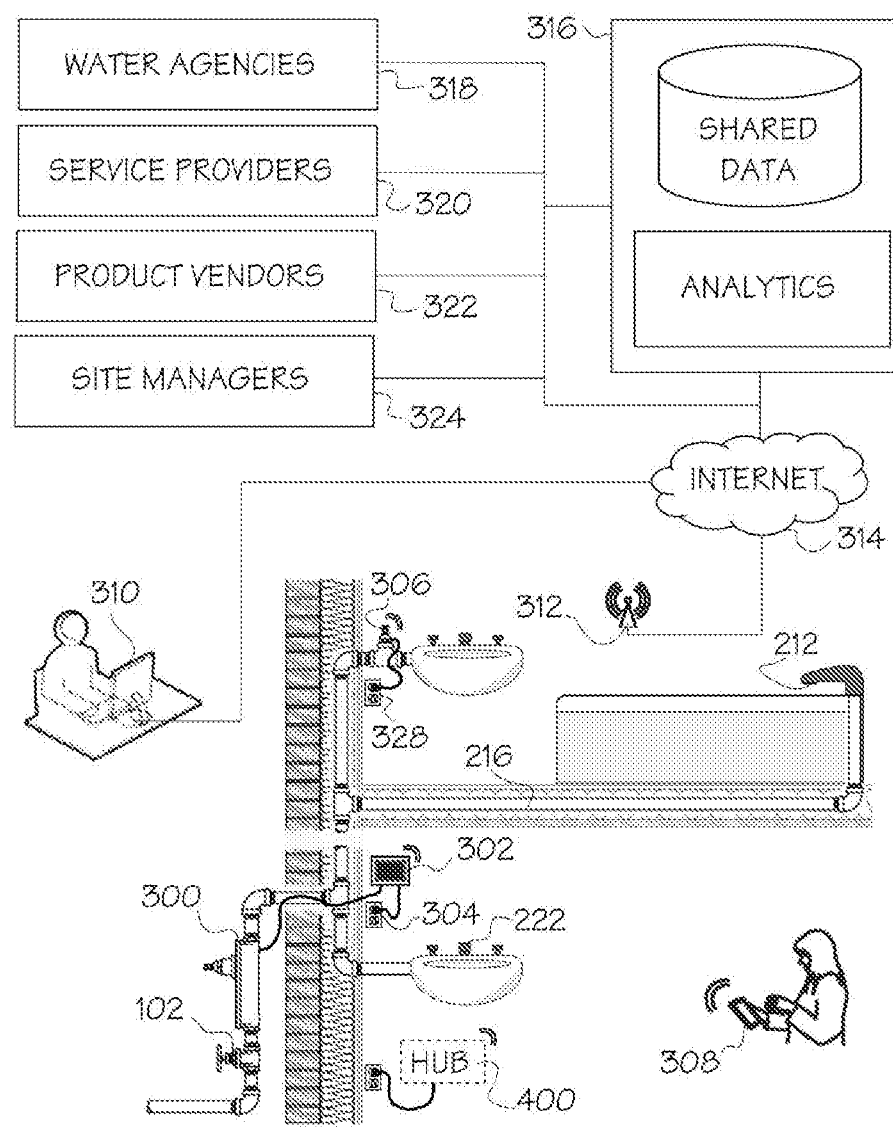
FIG. 4 is an illustrative example of an embodiment of the method, system, and devices integrating external contextual information.

Another embodiment of the method comprises adding the step of applying contextual information to the above mentioned embodiment so as to improve the speed and accuracy in detecting anomalous streams from among the identified independent component streams and to also increase the responsiveness and assertiveness of any corresponding remedial action directives for the anomalous streams detected. In this embodiment the communication device is able to both receive and send information to an existing local or remote information hub provided by a third party. An information hub collects and shares data amongst a plurality of devices at the site. The hereby disclosed method may receive contextual information from the hub. The contextual information may be of a local context or of a remote context. The hereby disclosed method may also share system information with the hub. As an illustrative example FIG. 4 shows the system and devices shown in FIG. 3. In addition FIG. 4 shows a local information hub 400 at the site that has been provided by a third party. In FIG. 4 the method uses the integral electronic device 302 to communicate wirelessly directly with the information hub 400, although the method could alternatively communicate wirelessly indirectly using the site's wireless network 312 or communicate by a wired protocol (e.g., power-line communication, CAT-5 Ethernet). As an operative example, if in FIG. 4, source signal 212 has been flowing for a while in the late evening, and without contextual data from the hub, after separating the signal mixture into independent source signal component A (in this case there is only one source signal in the mixture) the method may determine there is insufficient information to determine whether the separated source signal is or is not a harmless source signal (a Type B event). In this case the method's remedial directive would be to send a cautionary notification. However, if the method received local contextual data from the information hub 400 indicating no lights were on at the site and also received remote contextual data the vehicles associated with the site were at a distant location at the particular late evening time, the method could use this contextual information in the analysis of the separated source signal component being questioned and could now determine that the separated source signal component is within an improved degree of confidence not a harmless source signal (a Type A event) and the remedial directive issued by the method would now be to activate the automatic shut-off valve to stop further flow and to issue a notification of the action taken.

In one embodiment, a system used for detecting an anomaly in an aqueous stream network comprises an inlet feeding a plurality of independently-controlled valves at outlets of the stream network, such as depicted in FIG. 3 and FIG. 4. In one embodiment, the system comprises a flow sensor and an inlet pressure sensor positioned at the inlet of the stream network (e.g., 300 as displayed in FIGS. 3 and 4), a downstream pressure sensor (e.g., 306 as displayed in FIGS. 3 and 4) positioned in a branch of the network downstream of the inlet (where the branch feeds one of the independently-controlled valves at outlets of the stream network), and a data receiving and processing device (e.g., 302 as displayed in FIGS. 3 and 4). The data receiving and processing device (e.g., 302 as displayed in FIGS. 3 and 4) stores one or more programs, the one or more programs include instructions, which when executed by one or more processors cause the device to receive a flow reading from the flow sensor (e.g., at 300 as displayed in FIGS. 3 and 4), receive a first pressure reading from the inlet pressure sensor (e.g., at 300 as displayed in FIGS. 3 and 4), receive a second pressure reading from the downstream pressure sensor (e.g., 306 as displayed in FIGS. 3 and 4), estimate a pressure difference based on the first pressure reading and the second pressure reading, and detect the anomaly based on the flow reading and the pressure difference. In some embodiments, the anomaly is a leak. In other embodiments, the anomaly is a blockage.

In some embodiments, the systems described herein can detect an anomalous stream anywhere within the aqueous stream network without having to place a detection device at each and every branch or node of the network.

In some embodiments, the downstream pressure sensor (e.g., 306 as displayed in FIGS. 3 and 4) includes a single pressure sensor, and the system contains no more pressure sensors than the inlet pressure sensor (e.g., at 300 as displayed in FIGS. 3 and 4) and the downstream pressure sensor (e.g., 306 as displayed in FIGS. 3 and 4). In some embodiments, the use of few sensor components significantly decreases the labor and installation costs of the system.

In some embodiments, the system contains one or more additional downstream pressure sensors. In some embodiments, the system contains one or more additional pressure sensors at the inlet.

In some embodiments, the downstream pressure sensor (e.g., 306 as displayed in FIGS. 3 and 4) is positioned on an accessible pipe of the stream network. In some embodiments, placement of the downstream pressure sensor at the furthest accessible pipe of the stream network allows for more sensitive detection of anomalous streams. In some embodiments, the accessible pipe is any pipe on which a device can be installed without causing any major damage, such as destruction or removal of a wall, parts of a wall, a fixture, a cabinet, an enclosure, or any other physical obstructions or barriers. In some embodiments, the accessible pipe is the furthest accessible pipe of the stream network from the inlet.

In some embodiments, the inlet pressure sensor (e.g., at 300 as displayed in FIGS. 3 and 4) comprises two sensors positioned on opposite sides of a pressure regulating valve. In some embodiments, two pressure sensors are placed in the integrated device to capture the loss across the flow sensor which is non-linear and significant. In some embodiments, the sensors are on opposites sides of the pressure regulating valve but not necessarily next to it. In some embodiments, the placement of the components of the integrated device are ordered as follows: a first pressure sensor, a flow sensor, a pressure regulator, and a second pressure sensor.

In some embodiments, the two sensors may compensate for fluctuations in the upstream pressure as a result of the fluctuations from downstream pressure changes. The two sensors may also compensate for an inefficient or defective pressure regulating valve. Thus, implementation of this exemplary embodiment may only require placement of three devices at the readily accessible locations where access to any required power can be readily be made available, and can all be done with minimal plumbing expense and minimal total acquisition costs. In addition, since the system requires fewer devices and components placed throughout the stream network, this reduces the amount of error in the system, which includes installation error, user error, and error due to damage or aging of system components. In some embodiments, the inlet pressure sensor (e.g., at 300 as displayed in FIGS. 3 and 4) consists of a single pressure sensor. In some embodiments, the pressure regulating valve helps maintain a maximum pressure at the inlet of the aqueous stream network. In some embodiments, the pressure regulating valve helps maintain static pressure at the inlet of the aqueous stream network. In some embodiments, the maximum pressure is a static pressure.

In some embodiments, the system further includes an automatic shut-off valve positioned at the inlet (e.g., 300 as displayed in FIGS. 3 and 4). In some embodiments, the automatic shut-off valve is controlled by the data receiving and processing device. In some embodiments, the automatic shut-off valve is controlled by an external communication device. In other embodiments, the automatic shut-off valve can be operated manually.

In some embodiments, the instructions from the data receiving and processing device further include directions to send a signal to the automatic shut-off valve to close in response to detecting the anomaly (e.g., 306 as displayed in FIGS. 3 and 4). In some embodiments, the automatic shut-off valve may provide a fully autonomous anomaly detection and remediation device, when coupled with other embodiments described herein.

In some embodiments, the flow sensor, the inlet pressure sensor, and the automatic shut-off valve are integrated in a single device (e.g., all at 300 as displayed in FIGS. 3 and 4). In some embodiments, the single device further includes a pressure regulator. The single device design in some embodiments allow for ease of replacement when retrofitting an existing system by simply installing the single integrated device at an inlet to the network.

In some embodiments, the flow sensor, the inlet pressure sensor, the automatic shut-off valve, and the pressure regulator are each individual devices.

In some embodiments, the instructions from the data receiving and processing device further include receiving contextual information from an external analytic service (e.g., 312 as displayed in FIG. 3 or 4, and/or 400 as displayed in FIG. 4). In some embodiments, the external analytic device is a hub. In some embodiments, the hub is located locally (e.g., 400, as displayed in FIG. 4). In some embodiments, the hub is a remote information hub provided by a third party (e.g., 312, as displayed in FIGS. 3 and 4). In some embodiments, the hub collects and shares data locally between a plurality of devices at the site, such as with the data receiving and processing device (e.g., 302 as displayed in FIGS. 3 and 4). In some embodiments, the hub collects and shares data remotely via a wireless connection. In some embodiments, detecting the anomaly is based on the flow reading, the pressure difference, and the contextual information.

Figure 5:
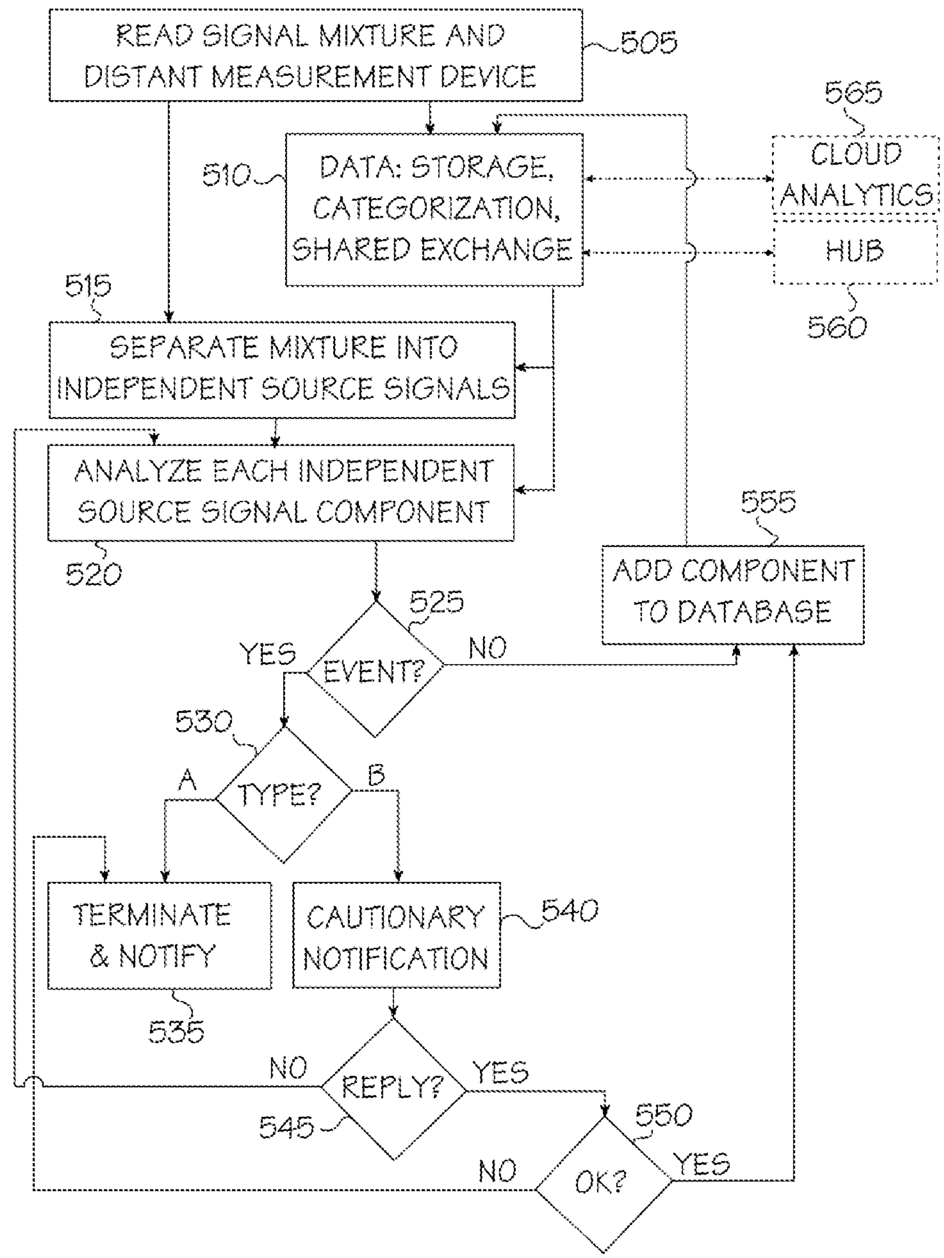
FIG. 5 illustrates a flowchart for the process of an embodiment of the method.

FIG. 5 illustrates a flowchart for the process of autonomously identifying the underlying independent component aqueous streams from the aqueous source feeding these multiple streams, detecting any anomalous streams from among the identified independent component streams, and determining remedial action directives based on analysis of any anomalous streams detected in accordance with an embodiment of the method. As the signal mixture and distant measure device characteristics are read 505 the data is stored and categorized 510. Data can be both shared with and received from third parties to the method such as a cloud analytics service 565 or an information hub 560 either which can help augment the method as previously described. The signal mixture is then separated into independent source signal components 515 using the real-time signal mixture characteristics 505 and the categorized data 510. Each of the separated independent source signals is then analyzed 520 using the categorized data 510. The method determines whether each of the separated independent source signals is a potentially anomalous source signal (an event) or not 525. In the case where the method determines that a separated source signal is not an event, the separated component is added to the component database 555 and stored 510. In the case of an event the method determines, with a certain degree of confidence, whether the event is not a harmless source signal (Type A) or whether there is insufficient information to determine whether the event is or is not a harmless source signal (Type B) 530. In the case the method determines that the event is a Type A event, the method will terminate the flow (e.g., activate an automatic shut-off valve) and issue a notification of the remedial action taken 535. In the case where the method determines that the event is a Type B event, the method will issue a cautionary notification regarding the uncertainty 540. The method may or may not receive a response 545 to the cautionary notification 540. Should no response be received, the method will continue to separate any active signal mixture and analyzing the separated components 520 with the uncertain separated source signal as suspect. In the case where a response is received the response could indicating that the uncertain separated source signal is not harmless or that it is harmless 550. In the case where the response indicated the uncertain source signal to not be harmless the method will terminate the flow (e.g., activate an automatic shut-off valve) and issue a notification of the remedial action taken 535. In the case where the response indicated the uncertain source signal to be harmless the separated component is added to the component database 555 and stored 510.

Also provided herein are methods of detecting and responding to an anomaly in an aqueous stream network, wherein the stream network comprises an inlet feeding a plurality of independently-controlled valves at outlets of the stream network, such as depicted in FIG. 3 and FIG. 4. In some embodiments, the method includes the steps of measuring a flow rate at the inlet (e.g., at 300 as displayed in FIGS. 3 and 4), measuring a pressure loss between the inlet and one of the independently controlled valves at outlets of the stream network (e.g., 306 as displayed in FIGS. 3 and 4), detecting the anomaly by analyzing the flow rate and the pressure loss, and initiating remedial action in response to detecting the anomaly. In some embodiments, the methods provided herein trigger remedial action before any significant damage has occurred.

In some embodiments, measuring the pressure loss includes measuring a pressure at a furthest accessible pipe from the inlet (e.g., 306 as displayed in FIGS. 3 and 4) in the aqueous stream. In some embodiments, measurement of the pressure at the furthest accessible pipe from the inlet allows for more sensitive detection of anomalous streams.

In some embodiments, measuring the flow rate includes periodically sampling a plurality of flow rates. In some embodiments, measuring the pressure loss comprises periodically sampling a plurality of pressure losses. In some embodiments, analyzing the flow rate and the pressure loss comprises analyzing the plurality of flow rates and plurality of pressure losses.

In some embodiments, measuring the pressure loss includes measuring a pressure at the inlet (e.g., 300 as displayed in FIGS. 3 and 4) and measuring a pressure at one of the independently controlled valves at outlets of the stream network (e.g., 306 as displayed in FIGS. 3 and 4).

In some embodiments, measuring the pressure at the inlet (e.g., 300 as displayed in FIGS. 3 and 4) includes measuring a pressure on opposite sides of a pressure regulator. In some embodiments, the two sensors may compensate for fluctuations in the upstream pressure as a result of the fluctuations from downstream pressure changes. The two sensors may also compensate for an inefficient or defective pressure regulating valve.

In some embodiments, the one of the independently controlled valves at outlets of the stream network is the furthest accessible pipe of the stream network from the inlet (e.g., 306 as displayed in FIGS. 3 and 4).

In some embodiments, data for the sampled flow rates and pressure losses are recorded and saved, such as with a data receiving and processing device (e.g., 302 as displayed in FIGS. 3 and 4) or an external analytic device (e.g., 312 as displayed in FIG. 3 or 4, and/or 400 as displayed in FIG. 4). In some embodiments, the sampled flow rates and pressure losses are recorded as signals. In some embodiments, the signals are mixed signals. In some embodiments, the signals are independent signals. In some embodiments, the device used to process the data uses independent component analysis to separate the mixed signals into independent signals. In some embodiments, a learning algorithm is used to classify or organize the independent flow rate signals from the independent component analysis to capture characteristics of all detected and processed signals. In some embodiments, patterns of signals will be recognized by the learning algorithm. In some embodiments, frequent patterns of signals will become more distinct over time and will form a categorized group of samples. In some embodiments, the categorized group of samples forms a database of distinct signatures. In some embodiments, the categorized group of samples will grow over time and the database of distinct signatures will evolve and develop over time and with use. In some embodiments, the data receiving and processing device processes the incoming data and an anomaly is detected when the data falls outside a predetermined range based on the categorized group of samples.

In some embodiments, all of the data is stored electronically in the data receiving and processing device. In some embodiments, the data is stored electronically in an external device. In some embodiments, the data receiving and processing device communicates the data to an external analytic service (e.g., 312 as displayed in FIG. 3 or 4, and/or 400 as displayed in FIG. 4). In some embodiments, the data receiving and processing device receives contextual information from the external analytic service. In some embodiments, the external analytic service is a hub. In some embodiments, the hub is located locally (e.g., 400, as displayed in FIG. 4). In some embodiments, the hub is a remote information hub provided by a third party (e.g., 312, as displayed in FIGS. 3 and 4). In some embodiments, the hub collects and shares data locally between a plurality of devices at the site, such as with the data receiving and processing device (e.g., 302 as displayed in FIGS. 3 and 4). In some embodiments, the hub collects and shares data remotely via a wireless connection. In some embodiments, the contextual information from the external analytic service is used to detect the presence of an anomaly. In some embodiments, detecting the anomaly is based on the flow reading, the pressure difference, and the contextual information. In some embodiments, detection of a possible anomaly occurs when a component signal is not assignable within a certain degree of certainty as belonging to one of the categorized group of samples.

In some embodiments, detecting the anomaly consists of analyzing the flow rate and the pressure loss. In some embodiments, the pressure loss is a dynamic pressure loss.

In some embodiments, detecting the anomaly further includes analyzing contextual information.

In some embodiments, the remedial action includes closing an automatic shut-off valve at the inlet. In some embodiments, the automatic shut-off valve may provide a fully autonomous anomaly detection and remediation device, when coupled with other embodiments described herein.

In some embodiments, initiating the remedial action includes providing cautionary notifications via a communication device (e.g., 302 and 312 as displayed in FIG. 3 or 4, and/or 400 as displayed in FIG. 4). In some embodiments, the method of detecting an anomaly in an aqueous stream network and initiating remedial action is completely autonomous and does not require any user intervention.

In summary, the implementation of an embodiment of the method as described herein may only require placement of single integrated device at the readily accessible water service entrance to the building, an integrated electronic device on the inside of the building, and an additional measurement device placed at the furthest external fitting that is readily accessible. The devices can therefore be placed where access to any required power can readily be made available and can all be done with minimal plumbing expense, minimal total acquisition costs, and fully autonomous without any user intervention and hence overcomes the shortfalls of current leak detection methods described earlier. The herein disclosed Autonomous Aqueous Stream Component Analysis method thereby provides a robust and cost-effective way to stop water leaks at a site and minimize water damage and conserve water resources. In addition, the data generated by the method, system, and devices described herein can be highly beneficial at a variety of different granularities for a variety of useful purposes.

While the exemplary embodiments of the methods described herein utilizes water as the aqueous source to illustrate the uniqueness and advantages of the method for the purpose of stopping water leaks and minimizing water damage in residential and commercial sites where most of the plumbing is internal and not readily accessible, the scope of the methods, together with its uniqueness and advantages, applies to any aqueous source stream (e.g., oil, fuel) and is not limited to residential or commercial sites.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims. It should be understood that the various embodiments have been presented by way of example only, and not by way of limitation. Likewise, the various diagrams may depict an example architectural or other configuration for the embodiments, which is done to aid in understanding the features and functionality that can be included in the disclosed embodiments. The disclosure is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can be applied alone, or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements, or components of the invention may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Further, as used herein, the term "accessible" may be understood to describe any location in which a device can be installed without causing any damage, such as destruction or removal of a wall, parts of a wall, a fixture, a cabinet, an enclosure, or any other physical obstructions or barriers. In some embodiments, the accessible location is a position on the pipe of the stream network that is not enclosed by a physical obstruction or barrier, such as a structure of the building housing an aqueous stream network. Examples of accessible locations for the placement of devices include, but are not limited to external pipes and water fixtures, such as below a sink. In some embodiments, the accessible location is near a power source at each water fixture to meet any power requirements of the system.

The invention claimed is:

1. A system for detecting an anomaly in an aqueous stream network, wherein the stream network comprises an inlet feeding a plurality of independently-controlled valves at outlets of the stream network, the system comprising:

flow sensor and an inlet pressure sensor positioned at the inlet;

a downstream pressure sensor positioned in a branch of the network downstream of the inlet, wherein the branch feeds one of the independently-controlled valves; and a data receiving and processing device storing one or more programs, the one or more programs comprising instructions, which when executed by one or more processors cause the device to:

receive a flow reading from the flow sensor, receive a first pressure reading from the inlet pressure sensor, receive a second pressure reading from the downstream pressure sensor, estimate a pressure difference based on the first pressure reading and the second pressure reading, and detect the anomaly based on the flow reading and the pressure difference.

2. The system of claim 1, wherein the downstream pressure sensor comprises a single pressure sensor, and wherein the inlet pressure sensor and the downstream pressure sensor are the only pressure sensors in the system.

3. The system of claim 1, wherein the down-stream pressure sensor is positioned on a pipe of the stream network.

4. The system of claim 3, wherein the pipe is positioned at a furthest position in the stream network from the inlet, wherein the furthest position is readily accessible for installation.

5. The system of claim 1, wherein the inlet pressure sensor comprises two sensors positioned on opposite sides of a pressure regulating valve.

6. The system of claim 1, wherein the inlet pressure sensor consists of a single pressure sensor.

7. The system of claim 1, further comprising an automatic shut-off valve positioned at the inlet.

8. The system of claim 7, wherein the instructions further comprise: in response to detecting the anomaly, send a signal to the automatic shut-off valve to close.

9. The system of claim 8, wherein the flow sensor, inlet pressure sensor, and automatic shut-off valve are integrated in a single device.

10. The system of claim 9, further comprising a pressure regulator integrated in the single device.

11. The system of claim 1, wherein the instructions further comprise: receiving contextual information from an external analytic service, and wherein detecting the anomaly is based on the flow reading, the pressure difference, and contextual information.

12. A kit for detecting an anomaly in an aqueous stream network, wherein the stream network comprises an inlet feeding a plurality of independently-controlled valves at outlets of the stream network, the kit comprising:

a flow sensor;

at least one inlet pressure sensor;

a downstream pressure sensor; and a data receiving and processing device storing one or more programs, the one or more programs comprising instructions, which when executed by one or more processors cause the device to:

receive a flow reading from the flow sensor, receive a first pressure reading from the inlet pressure sensor, receive a second pressure reading from the downstream pressure sensor, estimate a pressure difference based on the first pressure reading and the second pressure reading, and detect the anomaly based on the flow reading and the pressure difference.

13. The kit of claim 12, further comprising instructions for installation of the flow sensor, the inlet pressure sensor, the downstream pressure sensor, and the data receiving and processing device within the stream network.

14. The kit of claim 13, wherein the instructions instruct a position for the downstream pressure sensor on a pipe of the stream network.

15. The kit of claim 14, wherein the position is a furthest position in the stream network from the inlet where the furthest position is readily accessible for installation.

16. The kit of claim 13, wherein the kit comprises one inlet pressure sensor.

17. The kit of claim 13, wherein the kit comprises two inlet pressure sensors.

18. The kit of claim 17, wherein the instructions for installation instruct complementary positions for the two inlet pressure sensors, wherein the complementary positions are on opposite sides of a pressure regulating valve.

19. The kit of claim 12, wherein the flow sensor and inlet pressure sensor are integrated in a single device.

20. The kit of claim 19, further comprising a pressure regulator integrated in the single device.

21. A method of detecting and responding to an anomaly in an aqueous stream network, wherein the stream network comprises an inlet feeding a plurality of independently-controlled valves at outlets of the stream network, the method comprising the steps of:

measuring a flow rate at the inlet;

measuring a pressure loss between the inlet and one of the independently controlled valves;

detecting the anomaly by analyzing the flow rate and the pressure loss; and in response to detecting the anomaly, initiating remedial action.

22. The method of claim 21, wherein measuring the pressure loss comprises measuring a pressure at a position that is a furthest position in the stream network from the inlet where the furthest position is on a pipe that is readily accessible for installation.

23. The method of claim 21, wherein measuring the flow rate comprises periodically sampling a plurality of flow rates, wherein measuring the pressure loss comprises periodically sampling a plurality of pressure losses, and wherein analyzing the flow rate and the pressure loss comprises analyzing the plurality of flow rates and plurality of pressure losses.

24. The method of claim 21, wherein measuring the pressure loss comprises measuring a pressure at the inlet and measuring a pressure at one of the independently controlled valves.

25. The method of claim 24, wherein measuring the pressure at the inlet comprises measuring a pressure on opposite sides of a pressure regulator.

26. The method of claim 24, wherein the one of the independently controlled valves is after and proximal to the furthest position in the stream network from the inlet.

27. The method of claim 21, wherein detecting the anomaly consists of analyzing the flow rate and the pressure loss.

28. The method of claim 21, wherein the pressure loss is a dynamic pressure loss.

29. The method of claim 21, wherein detecting the anomaly further comprises analyzing contextual information.

30. The method of claim 21, wherein the remedial action comprises closing an automatic shut-off valve at the inlet.

31. The method of claim 21, wherein initiating the remedial action comprises providing cautionary notifications via a communication device.

* * * * *